United States Patent

George et al.

Patent Number: 6,035,010
Date of Patent: Mar. 7, 2000

[54] MONITOR FOR MEASURING BOTH THE GAMMA SPECTRUM AND NEUTRONS EMITTED BY AN OBJECT, SUCH AS SPENT NUCLEAR FUEL

[75] Inventors: Nicolaou George, Ettlingen; Abbas Kamel, Leopoldshafen; Koch Lothar, Weingarten, all of Germany

[73] Assignee: European Atomic Energy Community (Euratom), Luxembourg

[21] Appl. No.: 09/077,972

[22] PCT Filed: Oct. 7, 1997

[86] PCT No.: PCT/EP97/05500

§ 371 Date: Oct. 21, 1998

§ 102(e) Date: Oct. 21, 1998

[87] PCT Pub. No.: WO98/16935

PCT Pub. Date: Apr. 23, 1998

[30] Foreign Application Priority Data

Oct. 15, 1996 [EP] European Pat. Off. .............. 96116506

[51] Int. Cl.⁷ .................................................. G21C 17/06
[52] U.S. Cl. ........................ 376/257; 376/254; 376/245; 376/153
[58] Field of Search ...................... 376/153, 245, 376/251, 253, 254, 257; 250/390.01, 390.03, 390.07, 390.11, 472.1, 483.1, 484.1–484.5

[56] References Cited

U.S. PATENT DOCUMENTS

| | | | |
|---|---|---|---|
| 3,794,843 | 2/1974 | Chen | 250/359 |
| 4,325,785 | 4/1982 | Klotz et al. | 376/154 |
| 4,439,675 | 3/1984 | Campbell | 250/253 |
| 4,493,810 | 1/1985 | Lee et al. | 376/254 |
| 4,510,117 | 4/1985 | Phillips et al. | 376/257 |
| 4,622,200 | 11/1986 | Gold et al. | 376/159 |
| 4,881,247 | 11/1989 | Smith et al. | 376/257 |
| 5,098,640 | 3/1992 | Gozani et al. | 376/166 |
| 5,345,478 | 9/1994 | Maire et al. | 376/249 |

FOREIGN PATENT DOCUMENTS

| | | | |
|---|---|---|---|
| 54-155393 | 12/1979 | Japan | 376/272 |
| 54-159586 | 12/1979 | Japan | 376/257 |
| 59-31490 | 2/1984 | Japan | 376/272 |
| 61-176876 | 8/1986 | Japan . | |
| 61-70494 | 11/1986 | Japan | 376/272 |
| 1-092692 | 4/1989 | Japan . | |
| 6-160585 | 6/1994 | Japan . | |
| 6-34788 | 10/1994 | Japan | 376/272 |
| 917776 | 2/1963 | United Kingdom | 376/272 |

Primary Examiner—Charles T. Jordan
Assistant Examiner—Jack Keith
Attorney, Agent, or Firm—Sughrue, Mion, Zinn Macpeak & Seas, PLLC

[57] ABSTRACT

The present invention concerns a monitor for measuring both the gamma spectrum and neutrons emitted by an object such as a spent nuclear fuel pin or pin assembly or nuclear waste material. According to the invention, it comprises a lead block (1) presenting a front face (8) intended to be brought close to said pin (7) or assembly to be measured and incorporating a gamma detector (2) for gamma spectroscopy located close to a rear face of said block and associated with a collimator (4) extending from said front face to said gamma detector, two neutron detectors (3) which extend parallelly to each other and to said front face and are disposed symmetrically on either side of the axis of said collimator (4) close to said front face (8).

7 Claims, 1 Drawing Sheet

MONITOR FOR MEASURING BOTH THE GAMMA SPECTRUM AND NEUTRONS EMITTED BY AN OBJECT, SUCH AS SPENT NUCLEAR FUEL

The invention refers to a monitor for measuring both the gamma spectrum and neutrons emitted by an object such as a spent nuclear fuel pin or pin assembly or nuclear waste material.

In particular, this monitor is intended for the in situ measurement of neutrons and gamma radiation emitted by a spent nuclear fuel assembly to characterize the nuclear fuel in terms of burn-up, cooling time and inventory.

It could further be used for example to control at the customs containers which might contain fissile material, the traffic of which is forbidden.

Such measurements have been carried out until now in two different measuring apparatus, one equipped with a gamma detector and the other with a neutron detector. These devices must be associated to a mechanism for relative displacement of the measuring head with respect to the fuel pin or fuel assembly which might have a length of 3 meters or more.

Apart from the cost of providing two measurement apparatus intended to scan successively the fuel or from the problem of interchanging the measurement head of a unique apparatus in an highly dangerous environment, the precision of the measurement results depends also on the precision of the correlation between the two measurement cycles in order to associate to each scanned point of the measured fuel pin or assembly a couple of measurement values relating both to the gamma spectrum and the neutron emission.

It is well known in the art that gamma spectroscopy is performed by means of a gamma detector located in or behind a radiation protection such as lead or concrete, through which a tiny collimation channel is pierced. The open end of this collimator is intended to be close to the fuel pin or assembly to be scanned, whereas the other end is coupled to the gamma detector which might be a CdTe-crystal. Such a detector measures the gamma radiation spectrum which exists close to the open end of the collimator.

The neutron detectors commonly employed are cylindrical $^{235}$U fission chambers of about 70 mm length and 10 mm diameter, which are sensitive to thermal neutrons, but very insensitive to the intense gamma radiation emitted by the spent fuel. They should be placed with their axis perpendicular to the axis of the collimator and as close as possible to the point of measurement. A moderator material thermalizes the incident neutrons.

If a head combining both gamma spectroscopy and neutron detection was considered, then both detectors should be as close as possible to the scanned measurement point on the fuel pin or assembly. But the neutron detector should not be located too close to the collimator of the gamma detector in order not to unduly weaken the shielding effect of the material surrounding the collimator. Any compromise would yield in a distance between the two detectors which renders impossible a precise simultaneous measurement of both detectors at the same measurement point. The errors induced by this distance in the simultaneous measurement cannot be tolerated, if the values to be measured vary substantially along the scanning path, which is especially the case at the ends of the fuel pins.

The invention proposes a monitor which ensures simultaneous measurements of the gamma spectrum and of the neutron emission, which can be related to any particular scanning point on the fuel pin or assembly.

According to the invention, this aim is achieved by a monitor as defined in claim 1. As far as preferred embodiments of this monitor are concerned, reference is made to the secondary claims.

A preferred embodiment of the invention will now be described in more detail by means of the accompanying drawings.

Figure 1:
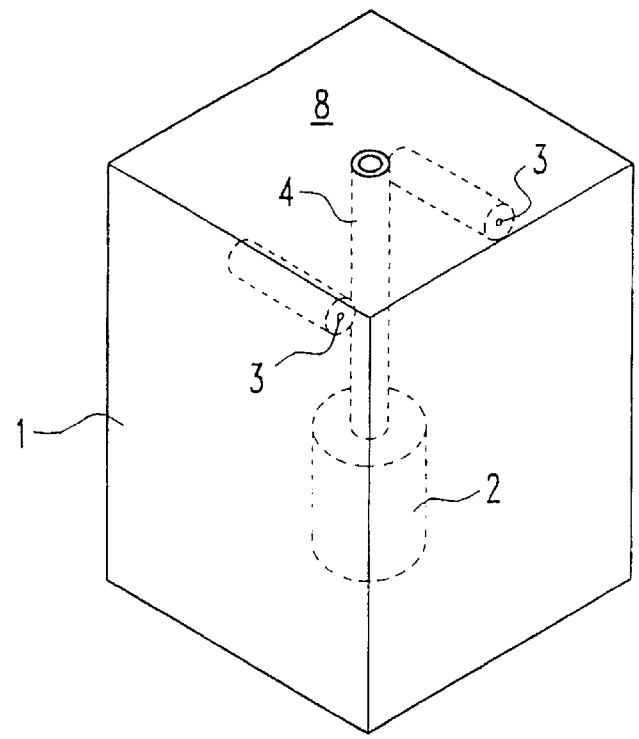
FIG. 1 shows schematically and in perspective the monitor according to the invention.
Figure 2:
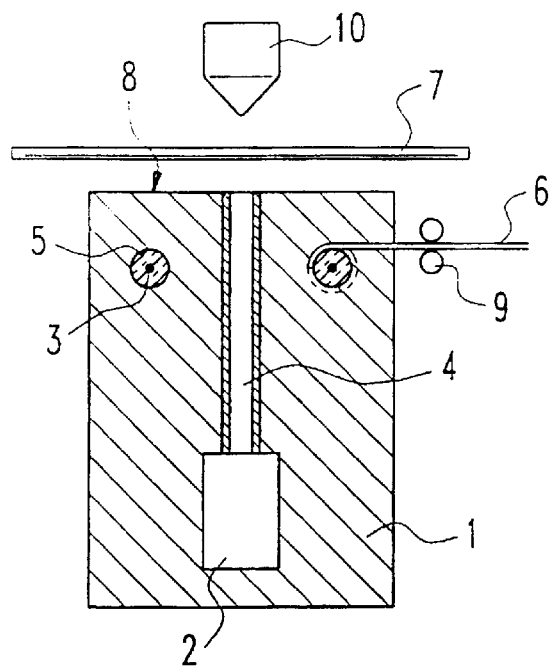
FIG. 2 represents a cut view of the monitor of FIG. 1 in relation to a fuel pin to be monitored.

Referring now to FIGS. 1 and 2, the monitor according to the invention comprises a lead block 1 in which a gamma detector 2 for gamma spectroscopy as well as two neutron detectors 3 are located. The block has a front face 8 which is the measurement face of the monitor and intended to be as close as possible to the fuel pin or assembly to be measured. A collimator 4 extends from the front face 8 through the block to the gamma detector 2 in the rear part of the block. The bore hole of the collimator has a diameter of about 2 or 3 mm and the block height is about 270 mm, the dimensions of the front face 8 being for example 200 mm×200 mm.

In accordance with the state of the art, the gamma detector 2 contains a crystal which operates at room temperature, for example a CdTe crystal or a CdZnTe crystal. A preamplifier is integrated into the detector and outlet conductors (not shown) are connected to nuclear instrumentation for treating and analysing the measurement results. In such a detector, an energy resolution (FWHM) of 7.2 keV at 662 keV is achieved which permits gamma spectroscopy of fission products in the spent fuel.

The collimator 4 may be equipped with a removable tube made of tungsten or the like in order to enhance the shielding of the detector. This tube may be removable in order to adapt the bore hole diameter or the material of this tube to the required collimator function.

The two cylindrical neutron detectors 3 are disposed perpendicularly to the scanning direction (in FIG. 2 along the pin axis) as well as parallel to each other and parallel to the front face 8 in the block close to this front face on either side of the collimator 4. The distance between the axis of each detector 3 and the axis of the collimator 4 must respond to contradictory requirements: On the one hand, this distance should be large enough in order not to weaken the shielding effect of the lead block around the collimator hole by the presence of the neutron detectors and moderating material, and on the other hand this distance should be as small as possible, so that the neutron and gamma detectors are as close as possible to the point under investigation. Due to the fact that the neutron emission is measured by two detectors disposed on either side of the ideal location which is occupied by the collimator 4, the measurement results of these two neutron detectors can be combined and a mean value can be established which corresponds with high precision to the neutron emission activity along the axis of the collimator 4.

The neutron detectors can be $^{235}$U fission chambers which are sensitive to thermal neutrons but very insensitive to the intense gamma radiation emitted by the spent fuel. The incident fast neutrons are thermalized by a moderator material 5 which surrounds the detectors. In a first embodiment as shown in FIGS. 1 and 2, this material completely surrounds the detectors and has a cylindrical tubular shape. According to a second embodiment of the invention shown in FIG. 3, the moderator material 5' occupies only a sector of about 90° out of the entire periphery around the detector axis. This sector begins in a plane parallel to the collimator axis and extends towards the collimator. Such a configuration enhances the contribution of neutrons coming from a reduced length range of the pins 7 on both sides of the collimator axis and reduces the contribution of neutrons from outside that range. Thus, a higher precision is obtained.

According to an additional feature, at least one of the neutron detectors together with its moderator is associated to mechanical means 9 for insertion of a cadmium sheet 6 around the moderator material or for withdrawing it therefrom. The detector with the cadmium sheet in place responds mainly to fast neutrons which pass through the cadmium in the detector while thermal and low energy neutrons are absorbed. Such a measure gives an additional information which facilitates the characterization of the fuel, under wet storage. The cadmium sheet 6 is inserted during a separate scanning cycle performed after a main scanning cycle in which both neutron detectors are used without shielding by a cadmium sheet.

The monitor as shown above can be used for either passive or active neutron measurements. In this latter case, a neutron source 10 such as an isotopic neutron source or a neutron generator must be placed in alignment with the collimator axis beyond the fuel pin or assembly. An arm must then be provided (not shown) which holds the source 10 and which is rigidly connected to the lead block 1. A moderating material can then be placed between the source 10 and the fuel pin or assembly for thermalising the incident neutrons.

The invention is not restricted to the embodiments as described and shown in the drawings. The lead block may have rectangular or circular cross-section. The collimator may be constituted purely by a bore hole in the lead block, or an insert tube may be used, made of tungsten or another appropriate material to shield the gamma radiation. The neutron detectors may be of any other appropriate type such as $^3$He, $BF_3$.

The monitor can be used in a dry storage environment as well as in a storage pool, if an appropriate water-tight casing is used.

Finally, the monitor according to the invention can be used not only for scanning fuel pins parallel to their axis, but also for monitoring the burn-up profile of a fuel assembly. In this latter case, a relative scanning movement is performed by which the lead block turns around the assembly.

The monitor could incorporate additional features for optimising the measurements: for example, to achieve repeatable counting geometries and to define the respective measuring position.

We claim:

1. A monitor for measuring both the gamma spectrum and neutrons emitted by an object, characterized in that said monitor comprises a lead block (1) presenting a front face (8) intended to be brought close to said pin or assembly (7) to be measured and incorporating a gamma detector (2) for gamma spectroscopy located close to a rear face of said block (1) and associated with a collimator (4) extending from said front face to said gamma detector, two neutron detectors (3) which extend parallelly to each other and to said front face (8) and are disposed symmetrically on either side of the axis of said collimator (4) close to said front face (8).

2. A monitor as claimed in claim 1, characterized in that the distance between the center of any of the neutron detectors (3) and the axis of the collimator (4) is between 10 and 50 times larger than the width of the collimator channel.

3. A monitor as claimed in claim 1, characterized in that the collimator (4) is constituted by a removable tube.

4. A monitor as claimed in claim 1, characterized in that the gamma detector (2) comprises a detector crystal operating at room temperature.

5. A monitor as claimed in claim 1, characterized in that at least one of the neutron detectors (3) is provided with mechanical means (9) for inserting a cadmium sheet (6) around its moderator material and for withdrawing the cadmium sheet therefrom.

Figure 3:
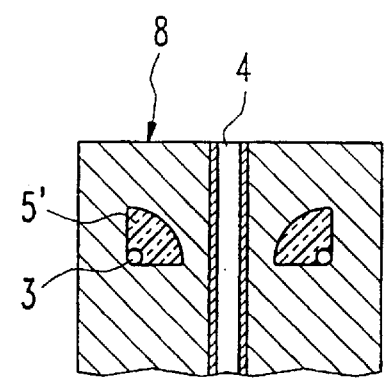
FIG. 3 represents a detail of an alternative realisation of the monitor.

6. A monitor as claimed in claim 1, characterized in that a moderator material (5') which thermalizes the incident neutrons is provided around each neutron detector (3) only in a sector of substantially 90° beginning in a plane parallel to the collimator axis and extending towards the collimator (FIG. 3).

7. A monitor as claimed in claim 1, characterized in that an arm is fixed to the lead block (1) and intended to hold a neutron source (10) behind a radiating object and in alignment with the collimator axis in such a way that the neutron beam of the source hits the object (7).

\* \* \* \* \*